United States Patent [19]
Neyret

[11] 3,920,379
[45] Nov. 18, 1975

[54] ASSEMBLY OF THE FLINT SPRING OF A GAS LIGHTER

[75] Inventor: Guy Neyret, Francheville, France

[73] Assignee: Etablissements Genoud & Cie Societe Anonyme, Venissieux, France

[22] Filed: Mar. 27, 1974

[21] Appl. No.: 455,319

[30] Foreign Application Priority Data
May 17, 1973 France .............................. 73.18801

[52] U.S. Cl. .............................................. 431/276
[51] Int. Cl.² ............................................ F23Q 1/02
[58] Field of Search ........... 431/130, 131, 142, 143, 431/150, 254, 276, 277

[56] References Cited
UNITED STATES PATENTS
3,523,005  8/1970  Piffath et al. ........................ 431/277

Primary Examiner—Carroll B. Dority, Jr.
Attorney, Agent, or Firm—Karl F. Ross; Herbert Dubno

[57] ABSTRACT

A flint wheel is mounted on a rotatable head for a gas lighter, the head being formed with a circular groove having a closed base and open to an upper side of the head. The groove coincides with a bore containing a flint urged against the wheel by a spring in the groove. The wheel is offset in relation to the groove to permit compression of the spring by a tool inserted through the open top of the groove to permit mounting of the wheel free from interference by the flint during manufacture.

1 Claim, 2 Drawing Figures

ASSEMBLY OF THE FLINT SPRING OF A GAS LIGHTER

The present invention relates to lighters of circular shape, in particular to gas lighters of the type in which the height of the flame is adjusted by rotating the head on the body.

It further relates to the assembly of the flint spring in this type of lighter, an assembly in which the spring is housed in a hole in the shape of a groove concentric with an axial hub which forms part of the rotary connection of the head to the body. In this known type of assembly, the aforesaid groove opens out on the side of the head backing onto the body. The spring thus bears against the head and pushes the flint which is engaged in a hole provided in the head and opening out on either side of the latter.

Though this solution may be advantageous, it nevertheless makes the assembly of the flint dependent on that of the head to the extent that the spring must be located in the groove in the head before assembling the latter on the body, which constitutes a disadvantage in the assembly operations in the case of mass-production.

On the other hand, the fact that this spring bears against the upper side of the body produces resistance to the rotation of the head and, if it does not bear in a sliding manner on the upper side of the body, it is possible that the spring will stretch and twist, thus exerting a return force on the head, thereby modifying the adjustment.

The present invention relates to another solution which, although similar to the afore-mentioned, makes it possible to mount the head on the body before positioning the spring and its flint and does not modify the characteristics of the spring at the time of rotation of the head.

To this end, there is provided according to the invention an assembly of a flint spring of a gas lighter in which the height of the flame is adjustable by rotation of a head on a body of the lighter (as shown in applicants' copending applications Ser. Nos. 376,446, filed July 5, 1973, now U.S. Pat. No. 3,884,618, and 418,823, filed Nov. 26, 1973), now U.S. Pat. No. 3,884,616, and in which the assembly is formed with a circular groove housing the flint spring, the circular groove having a closed base and opening out at an upper side of the head, and the groove and the spring disposed therein having diameters which are greater than a vertical projection of the large diameter of a flint wheel of the lighter.

A fixed support point of the spring is thus constituted by the closed end of the hole formed by this groove, and the movable support point of the spring is constituted by the flint retained under the flint-wheel.

Thus, once the head is mounted on the body and the initial adjustment has been carried out, this design makes it possible to finally position the spring in its hole and to compress it therein by means of a tool introduced into the hole from above, before positioning the flint and the flint-wheel, the introduction of this tool not hindering the subsequent positioning of the flint-wheel owing to the fact that the diameter of this hole is greater than the vertical projection of the large diameter of the flint-wheel.

Nevertheless, the invention will be better understood with reference to the accompanying diagrammatic drawing, given solely as an example and in which.

Figure 1:
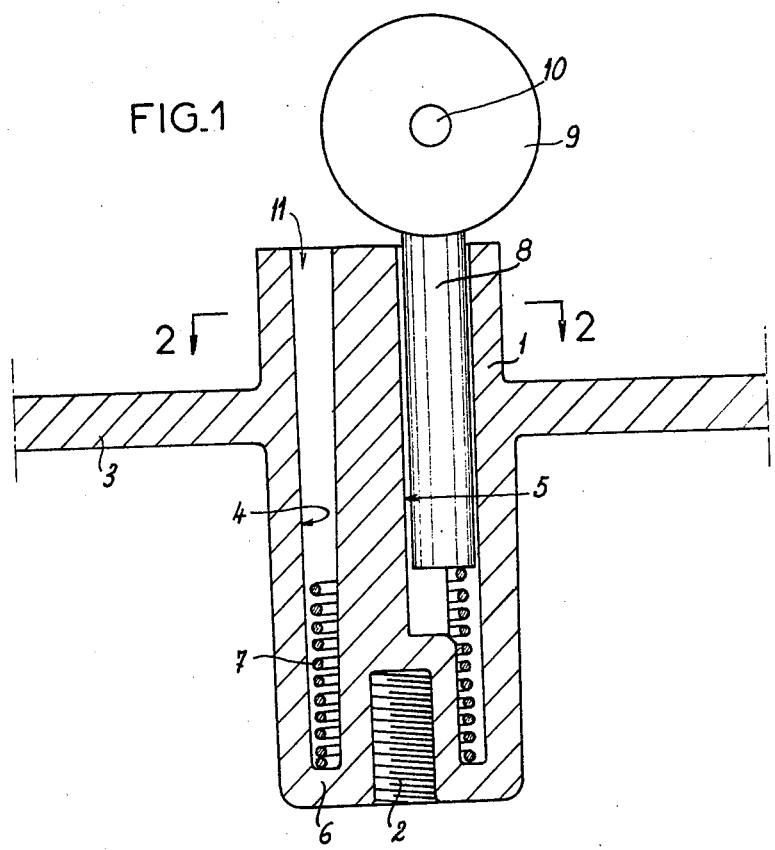
FIG. 1 is an elevational sectional view of the rotating head.
Figure 2:
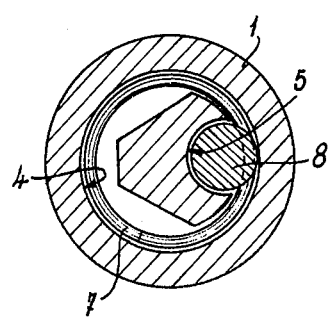
FIG. 2 is a plan view thereof, on section line 2—2 of FIG. 1.

In the drawing, the reference numeral 1 designates the rotating head provided, on its lower side, with a tapped blind hole 2 for the purpose of mounting it, by screwing, on a screw-threaded lug of the lighter body, the adjustment in height of the lighter flame being obtained by rotating the head by means of a gripper member 3.

According to the invention, this head comprises a groove 4 which, concentric with the axis of the tapped hole 2, opens out on the upper side.

Provided tangentially with respect to this groove 4, which forms a closed hole in its base, is a cylindrical hole 5 also opening out on the upper side of the head.

The base of the aforesaid groove is thus closed by a part 6.

A spring 7 is introduced freely into this groove, which spring thus exerts its action on a flint 8 with a view to keeping the upper end thereof in contact with the flint-wheel 9 mounted to rotate about a pin 10 supported by a cheek (not shown) on the head 1.

It will thus be understood that the lower end of the spring 7 bears against the bottom of the groove 4 and is kept under tension by the fact that its other end bears against the flint 8.

It is therefore possible, after positioning the spring in its groove, to ensure the compression thereof by a tool introduced from above into the groove in the direction 11 and thus to position the flint 8 and flint-wheel 9 without this tool hindering the positioning of the latter by mounting it on the pin 10, since this direction is located outside the vertical projection of the flint-wheel.

What is claimed is:

1. A striker head for a lighter comprising:
   a cylindrical body;
   an axially extending circular groove formed in said body and defining a central core within said groove, said groove having a closed bottom within said body and an annular mouth opening at a surface thereof;
   an axially extending bore having a diameter less than that of said circular groove formed in said core and intersecting said groove along one side thereof;
   a compression spring positioned in said groove against said closed end and surrounding said core;
   a flint in said bore engaged by said spring;
   a flint wheel positioned above said bore and engaged by said flint, said wheel overlying only said one side of said mouth and leaving a segment thereof around the diametrically opposite side thereof exposed to receive a tool for compressing said spring; and
   means on said cylindrical body for securing same to a lighter body.

* * * * *